June 23, 1942.  M. C. KNIGHT  2,287,313
REFRIGERATING APPARATUS
Filed Nov. 9, 1940
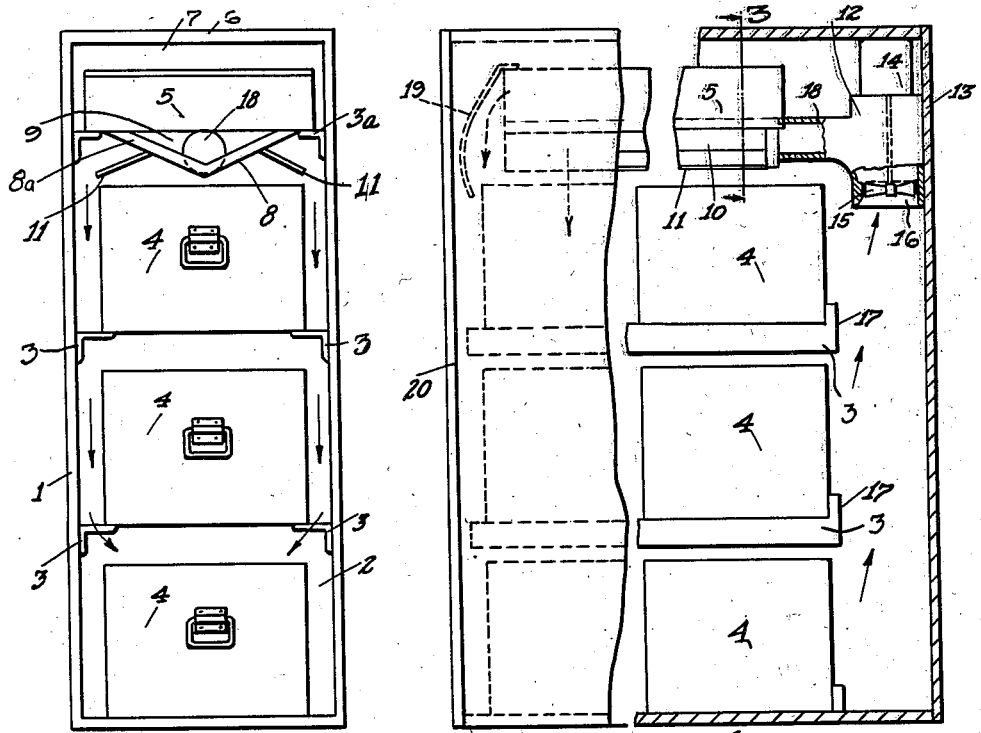
Fig. 1.  Fig. 2.
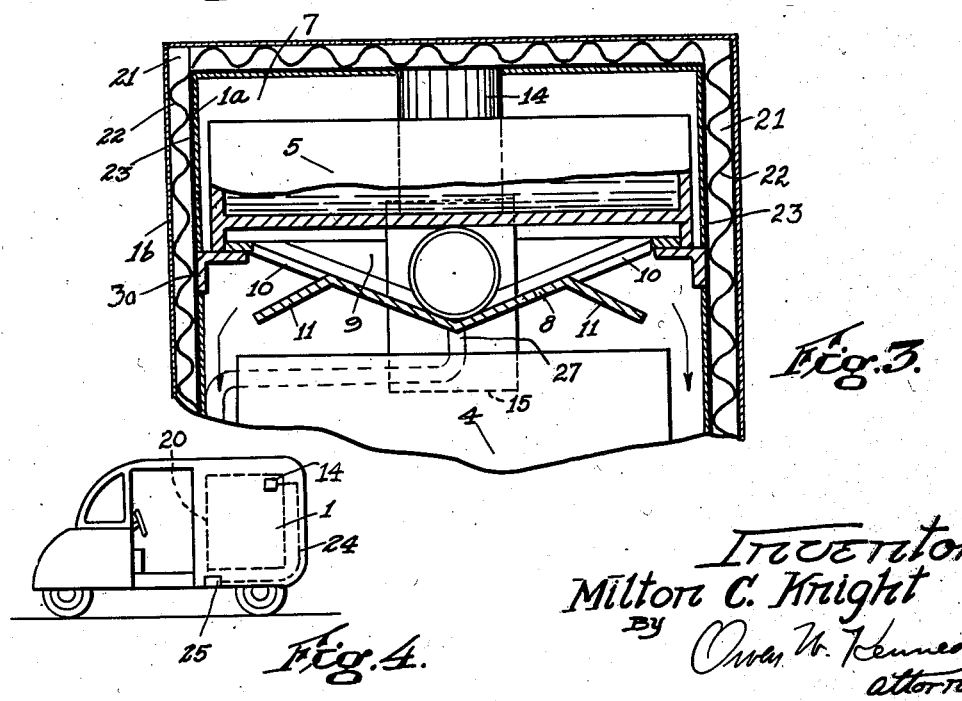
Fig. 3.
Fig. 4.
Inventor:
Milton C. Knight
By
Owen W. Kennedy
attorney Patented June 23, 1942

2,287,313

UNITED STATES PATENT OFFICE 2,287,313

REFRIGERATING APPARATUS

Milton C. Knight, Worcester, Mass.

Application November 9, 1940, Serial No. 365,023

6 Claims. (Cl. 62—72)

The present invention relates to refrigerating apparatus, particularly adapted for the transportation of perishable food products in a motor vehicle, such as a milk route delivery truck.

The apparatus of the present invention is characterized by its simplicity of construction, and its effective distribution of cold air over the entire food storage compartment, so as to obtain a maximum refrigerating effect from the supply of coolant with which the apparatus is charged when the truck starts on its delivery route. Furthermore, the blower embodied in the apparatus is adapted to operate with a relatively small consumption of power from the battery of the truck, as distinguished from mechanically driven refrigerating apparatus which requires the development of a considerable amount of power, in order to obtain the refrigerating effect. The above and other advantageous features of the invention will hereinafter more fully appear from the following description considered in connection with the accompanying drawing, in which:

Fig. 1 is a view in front elevation of refrigerating apparatus embodying the invention, with the door to the food compartment removed.

Fig. 2 is a view in side elevation of the apparatus shown in Fig. 1, with certain parts broken away to show the construction.

Fig. 3 is an enlarged fragmentary sectional view along the line 3—3 of Fig. 2, looking in the direction of the arrows.

Fig. 4 is a diagrammatic view, illustrating the installation of the apparatus in a milk delivery truck.

Referring to the drawing, the apparatus consists of a rectangular casing 1, enclosing a chamber 2 for the reception of the food products to be cooled. A series of racks 3 extend longitudinally of the chamber 2, with the spacing between adjacent pairs of racks being such that a number of layers of standard milk bottle crates 4 may be stored within the chamber. The width of the chamber 2 is appreciably greater than the width of a crate 4, and it is to be noted that the vertical spacing of the racks 3 is such that the tops and bottoms of crates in adjacent rows are separated, so that air can circulate freely around the crates.

The upper pair of racks 3a serve to support between them a tray 5 for the reception of a suitable coolant, such as hard frozen brine, or ice if desired. The tray 5 is separated from the top 6 of the casing 1 by an air space 7, and a baffle 8 extends the length of the chamber 2, between the bottom of the tray 5 and the uppermost layer of crates 4. The baffle 8 is V-shaped in cross-section, so as to provide a duct 9 extending along the bottom of the tray 5, and as indicated in Fig. 3, each side of the baffle provides a slot 10, created by bending a cutout portion of the baffle downwardly to form a wing 11 extending in the direction of a side wall of the casing 1.

As best shown in Fig. 2, a blower unit 12 is mounted between the end of the tray 5 and the rear wall 13 of the casing, and comprises an electric motor 14 connected to a fan 15 located within an inlet opening 16, disposed in a horizontal plane slightly below the bottom of the baffle 8. It is to be noted that the rear ends of the crate racks 3 are bent upwardly at 17, to provide stops for the innermost crates 4, so that there is always a clear space extending below the blower intake 16 to the bottom of the casing.

The outlet 18 for the blower is so positioned as to be substantially in alinement with the duct 9 extending between the baffle 8 and the bottom of the tray 5. Consequently, a major portion of the air delivered from the outlet passes along the cold bottom of the pan 5, with the inclined sides of the baffle 8 serving to divert this chilled air first through the slots 10, and then downwardly along the side walls of the casing, as indicated by the arrows in Fig. 1. Due to the force of the air current moving along the duct 9, some of the chilled air will traverse the entire length of the duct beyond the slots 10, and as best shown in Fig. 2, a curved deflector 19 is adapted to direct this air downwardly into the space between the casing door 20 and the fronts of the milk crates 4, as indicated by the arrows. This deflector 19 is shown as having been removed in Fig. 1, in order to better show the relation between the tray 5 and the baffle 8.

From the foregoing, it is apparent that operation of the blower 12 will set up an extremely effective circulation of air within the chamber 2, so as to obtain a maximum refrigerating effect from the coolant within the tray 5. The disposition of the blower outlet 18 so as to direct the air horizontally along the bottom of the cooling tray 5, utilizes the natural tendency of chilled air to move downwardly past the wings 11 on opposite sides of the chamber 2, while the blower inlet 16 is so positioned as to draw in the somewhat warmer air that rises naturally toward the rear of the chamber, after passing over and around the bottle crates. As a result of the very effective circulation of chilled air throughout the chamber 2, as indicated by the arrows in Fig. 2, it is possible to maintain a temperature of around 40° in the chamber 2 for a period of at least ten hours following the charging of the apparatus with a tray 5 of hard frozen brine, which period is quite sufficient for keeping milk in good condition while a truck is making deliveries along its route.

Referring again to Fig. 3, the walls of the casing 1 are shown as being hollow, so that an air space 21 extends entirely around the storage chamber 2 for purposes of heat insulation. In order to restrict the circulation of heat or cold through the walls, thermal insulation is provided in the form of sheets 22 of thin metallic material, commonly known as foil, which provides reflective surfaces on both sides. As a result, the passage of heat through the walls of the chamber 2 is very much restricted, due to reflecting properties of the foil 22. In order to further restrict the passage of heat through the chamber wall, the inner wall section 1a provides a coating 23 of beeswax, which has been found to be extremely effective in sealing off the chamber 2 against any heat transfer from the outside. That is to say, with the outer chamber wall 1b subjected to a relatively high temperature, as in the summer time, the direct transmission of heat through the wall space 21 by the foil itself is prevented by the presence of the wax layer 23 where the foil comes into contact with the inner wall section 1a.

As previously pointed out, the apparatus of the present invention is particularly adapted for transportation of perishable food products in a motor vehicle, such as a milk route delivery truck, and the apparatus is shown installed in such a truck in Fig. 4. As shown, the front door 20 of the casing 1 is readily accessible to the driver of the truck, so that milk bottles can be conveniently removed from the crates 4. The motor 14 for driving the blower is shown in Fig. 4 as being connected by a cable 24 to the battery 25 of the truck through a suitable switch 26, and it is necessary to run the blower motor 14 only while crates containing undelivered milk bottles remain within the chamber 2. Thus the motor 14 takes current from the battery only during relatively short periods, and the amount of power required is relatively small, due to the ready circulation of air through the chamber 2.

With the baffle 8 extending beneath the entire length of the tray 5, all drip from the tray is collected by the baffle and prevented from getting on the milk bottles. As shown in Fig. 1, the baffle provides end flanges 8a to prevent any drip from overflowing at the ends, and a drain pipe 27 at the blower end of the baffle 8 carries off any accumulated moisture.

I claim:

1. Refrigerating apparatus comprising, in combination, a casing having walls of thermal insulating material, and providing a chamber having longitudinally extending racks for supporting rows of carriers for perishable food, with said carriers spaced from each other and from the side walls of said chamber, means for supporting a container for a coolant in the upper portion of said chamber above said carriers, and means at one end of said casing for directing a current of air first along the bottom of said coolant container in an unobstructed path toward the opposite end of said casing, and then downwardly around said food carriers.

2. Refrigerating apparatus comprising, in combination, a casing having walls of thermal insulating material, and providing a chamber having longitudinally extending racks for supporting rows of carriers for perishable food, with said carriers spaced from each other and from the side walls of said chamber, means for supporting a container for a coolant in the upper portion of said chamber above said carriers, means at one end of said casing for directing a current of air along the bottom of said coolant container in an unobstructed path toward the opposite end of said casing, and means for deflecting the chilled air downwardly over the food carriers within said chamber.

3. Refrigerating apparatus comprising, in combination, a casing having walls of thermal insulating material, and providing a chamber having longitudinally extending racks for supporting rows of carriers for perishable food, with said carriers spaced from each other and from the side walls of said chamber, means for supporting a container for a coolant in the upper portion of said chamber above said carriers, means at one end of said casing for directing a current of air along the bottom of said coolant container in an unobstructed path toward the opposite end of said casing, centrally of said chamber, and means for deflecting the thus chilled air in opposite directions towards the walls of said chamber, and downwardly over said food carriers.

4. Refrigerating apparatus comprising, in combination, a casing having walls of thermal insulating material, and providing a chamber having longitudinally extending racks for supporting rows of bottle crates, with said crates spaced from each other and from the side walls of said chamber, means for supporting a container for a coolant in the upper portion of said chamber above said crates, a baffle defining a passage between the bottom of said coolant container and the upper layer of crates, a blower mounted at one end of said chamber for directing a current of air through said passage in an unobstructed path toward the opposite end of said chamber, and means provided by said baffle for deflecting the chilled air towards the walls of said chamber, and downwardly over said crates.

5. Refrigerating apparatus comprising, in combination, a casing having walls of thermal insulating material, and providing a chamber having longitudinally extending racks for supporting rows of bottle crates, with said crates spaced from each other and from the side walls of said chamber, means for supporting a container for a coolant in the upper portion of said chamber above said crates, a baffle defining a passage between the bottom of said coolant container and the upper layer of crates, and a blower mounted at one end of the chamber, with its intake located above said crates and its outlet adapted to deliver a current of air into said baffle passage in an unobstructed path toward the opposite end of said chamber, with said baffle being so formed as to deflect chilled air towards the sides of the chamber and downwardly over said crates.

6. Refrigerating apparatus comprising, in combination, a casing having walls of thermal insulating material, and providing a chamber having longitudinally extending racks for supporting rows of bottle crates, with said crates spaced from each other and from the side walls of said chamber, means for supporting a container for a coolant in the upper portion of said chamber above said crates, a baffle having inclined portions defining a passage between the bottom of said coolant container and the upper crates, with slots in said baffle portions opening towards the side walls of said chamber, and a blower at one end of said passage for directing a current of air through said baffle passage in an unobstructed path toward its opposite end, with said slots serving to direct the chilled air downwardly along the walls of said chamber.

MILTON C. KNIGHT.